J. P. MARKERT & R. S. BOLGER.
BOX COVERING MACHINE.
APPLICATION FILED JAN. 14, 1913.

1,190,928.

Patented July 11, 1916.
7 SHEETS—SHEET 7.

WITNESSES

INVENTORS
John P. Markert
Robert S. Bolger
BY
ATTORNEYS

UNITED STATES PATENT OFFICE.

JOHN P. MARKERT AND ROBERT S. BOLGER, OF NEW YORK, N. Y.; SAID BOLGER ASSIGNOR TO SAID MARKERT.

BOX-COVERING MACHINE.

1,190,928.

Specification of Letters Patent.

Patented July 11, 1916.

Application filed January 14, 1913. Serial No. 742,080.

*To all whom it may concern:*

Be it known that we, JOHN P. MARKERT and ROBERT S. BOLGER, citizens of the United States, residing in the counties of Kings and Queens, respectively, in the city of New York and State of New York, have invented certain new and useful Improvements in Box-Covering Machines, of which the following is a full, clear, and exact description.

This invention relates to box covering machines of that general class in which the formed boxes are fed to suitable clamping heads which grip them and convey them by stages through the machine, in the course of which a covering of sheet material, such as paper, is applied and secured to the exterior of the box, after which the box is ejected from the machine.

The general type of machine described herein and illustrated in the accompanying drawings is one which is already well known, but the improvements which are claimed in this application for patent are designed to perfect the machine in various details of construction and operation. In order to give a full understanding of these improvements, it has been considered necessary to describe and illustrate features of the machine as a whole which are not to be claimed herein. What these improvements are will be fully brought out in the description which follows, and specifically in the claims appended hereto.

With reference to the accompanying drawings.

Figures 1, 5, 25, 26:
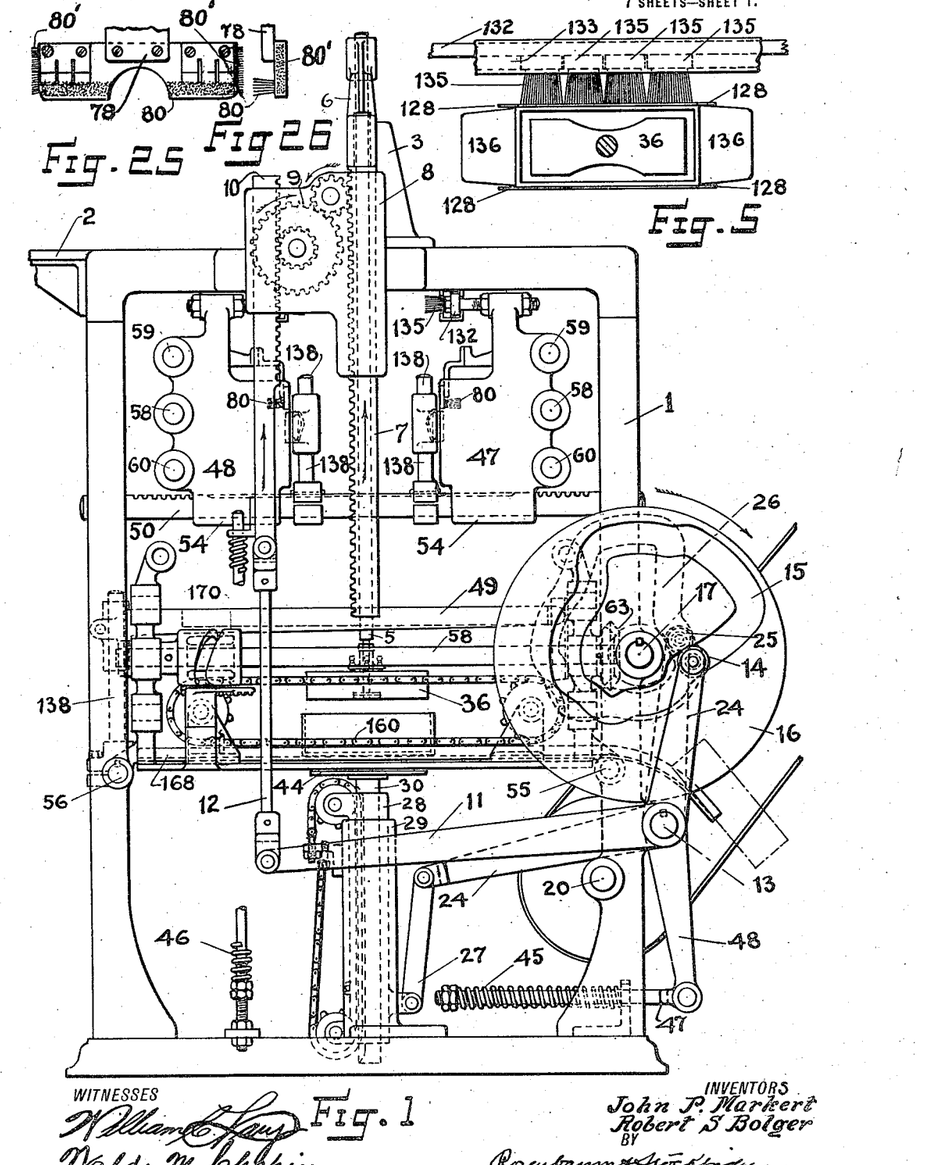
Figure 1 is a side elevation of the machine with some parts broken away and others omitted, but showing all that is necessary in order to illustrate our improvements.
Fig. 5 is a plan of a portion of the brush-holder and brush showing its coöperation with the side of a box.
Figs. 25 and 26 are front and end views of the margin wiping brush and holder.
Figures 16, 17, 18, 19, 23, 24:
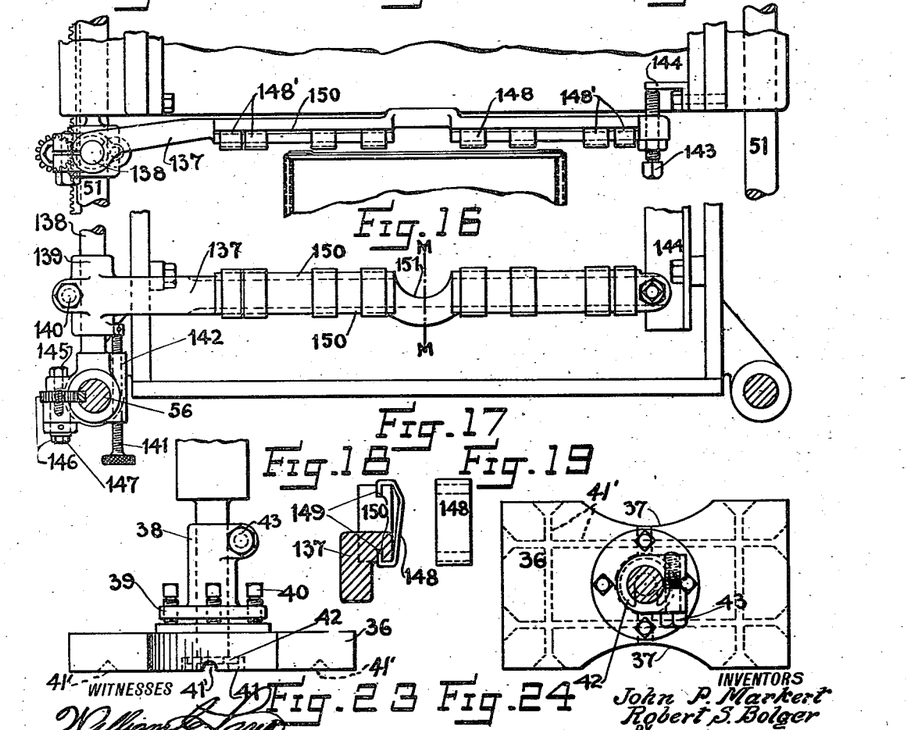
Fig. 16 is a plan of the resisting-bar and its mounting.
Fig. 17 is a front elevation of the same.
Fig. 18 is a section through the middle of the resisting bar on the line M, M, Fig. 17.
Fig. 19 is a face view of one of the contact plates on the resisting bar.
Figs. 23 and 24 are, respectively, a side view and a sectional plan of the upper box-clamping head.

The main frame of the machine is indicated by 1, in front and at the top of which, being to the left in Fig. 1, is fixed a feeding table 2 in front of which an operator is to stand who delivers boxes of general rectangular shape such, for instance, as is seen in Fig. 5, and the cover blanks therefor to the mechanism which is to receive them and perform the various operations of applying the covering material to the boxes. Midway across the top of this frame 1 is a yoke-shaped frame 3 having at its middle point a bearing 4 for the upper plunger-rod 5 which reciprocates therein through the center of the machine. The upper end of this rod is secured to an arm 6 which reaches to the side of the machine and is there attached to the upper end of a vertical reciprocating rack-bar 7 moving in a suitable guiding bracket 8 fixed to the side of frame 1 at the top. Within this bracket 8 are housed a train of multiplying gears 9, one end of which engages with the rack 7 and the other end with a rack 10 traveling in a plane parallel to that of the rack 7 and also guided in the bracket 8. The lower end of rack 10 is connected to the end of a bell-crank lever 11 by a link 12. The bell-crank lever is fulcrumed upon a shaft 13 and its arm carries a roller 14, which runs in a cam-groove 15 in a disk 16 mounted on the power-shaft 17 of the machine. This power-shaft is driven through gears 18 and 19 from the main shaft 20, the latter being adapted to be connected with a suitable source of power by any suitable means as 21 when the foot pedal 22 is depressed, the machine running as long as the treadle is held down and stopping when it is allowed to lift under the action of the spring 23. On the shaft 13 there is also keyed a second bell-crank lever 24, one end of which carries a roller 25 shown in dotted lines in Fig. 1 which plays in a cam-groove 26 on the opposite side of disk 16. The other arm of the lever 24 is connected by means of a link 27 with one section 28 of a two-part vertical plunger mounted to slide in a fixed guide 29. Within this plunger section 28 is the second plunger section 30 adapted to slide vertically therein. The section 28 carries two sprocket-wheels 31 and 32 mounted to turn in brackets fixed, respectively, at the extremities of said section, and around these sprocket wheels passes a chain 33 which is fixed by means of a screw 34 to the plunger section 30. The two ends of the chain 33 are anchored to a bracket 35 which is attached to the fixed guide 29, an adjustment controlled by nuts being provided at the ends of the chain whereby slack therein can be taken up. With this arrangement, it will be seen that when the plunger section 28 is raised or lowered, the section 30 is carried therewith, but at a speed twice that of the section 28, due to the fact that the chain which is connected to the section 30 and has its ends fixed at 35, causes the sprocket wheels to rotate and impart a secondary motion to the section 30. A sectional or telescoping plunger of this character provides a long stroke for the plunger as a whole without the necessity of extending it below the base of the machine. The upper plunger-rod 5 is provided at its lower end with a box-clamping head or block 36, the details of which are shown in Figs. 23 and 24. The two opposite sides of this block are cut away, as shown, at 37, for a purpose which will hereinafter appear, and the block is attached to the end of the plunger in such a manner that it may be leveled with respect to the platen on the lower plunger hereinafter referred to. This construction consists of a sleeve 38 which is first passed over the end of the plunger, the passage therethrough being of the same size as the end diameter of the plunger. This sleeve is provided with a flange 39 carrying four set-screws 40 spaced 90 degrees apart. The plunger passes through an enlarged central hole in the head 36 which is countersunk on its under side as seen at 41, and in adjusting the head to the plunger the head is pushed up along the plunger until the lower end of the latter is exposed below the lower surface of the head 36; then a split washer 42 acting as a cross-head is inserted laterally into an annular groove in the end of the plunger, after which the head is lowered until the washer and the end of the plunger are fully housed within the countersink in the face of the head. Then the sleeve 38 is moved down and clamped in position, and if the head 36 requires tilting in any direction in order that it shall coöperate properly with the lower plunger platen, this is done by setting up some of the screws 40 and slacking others until the proper level is obtained. The sleeve 38 is rigidly clamped to the end of the plunger by means of the bolt 43. The tilting of the head upon the end of the plunger is permitted by reason of the enlarged passage in the head and the whole structure becomes rigid when once set by tightening up on the set-screws 40. The lower plunger platen, which is merely a plate 44, removably fixed to the upper end of the section 30 of the lower plunger, is located directly beneath the upper plunger 36 and they are adapted to act together to hold a box firmly while the covering is being applied thereto. For this purpose the box is first deposited upon the lower plunger, whereupon the upper plunger passes down into the box and clamps the bottom thereof against the lower plunger.

From the construction described it will be seen that the two plungers are positively raised and lowered in a certain varying relation to each other controlled by the shape of the cam grooves 15 and 26 in the disk 16. In order to counterbalance the weight of the plunger parts and racks, the springs 45 and 46 are provided, the former acting through a rod 47 and crank 48 keyed on the shaft 13 and the latter acting upon the rack-bar 10.

Figure 2:
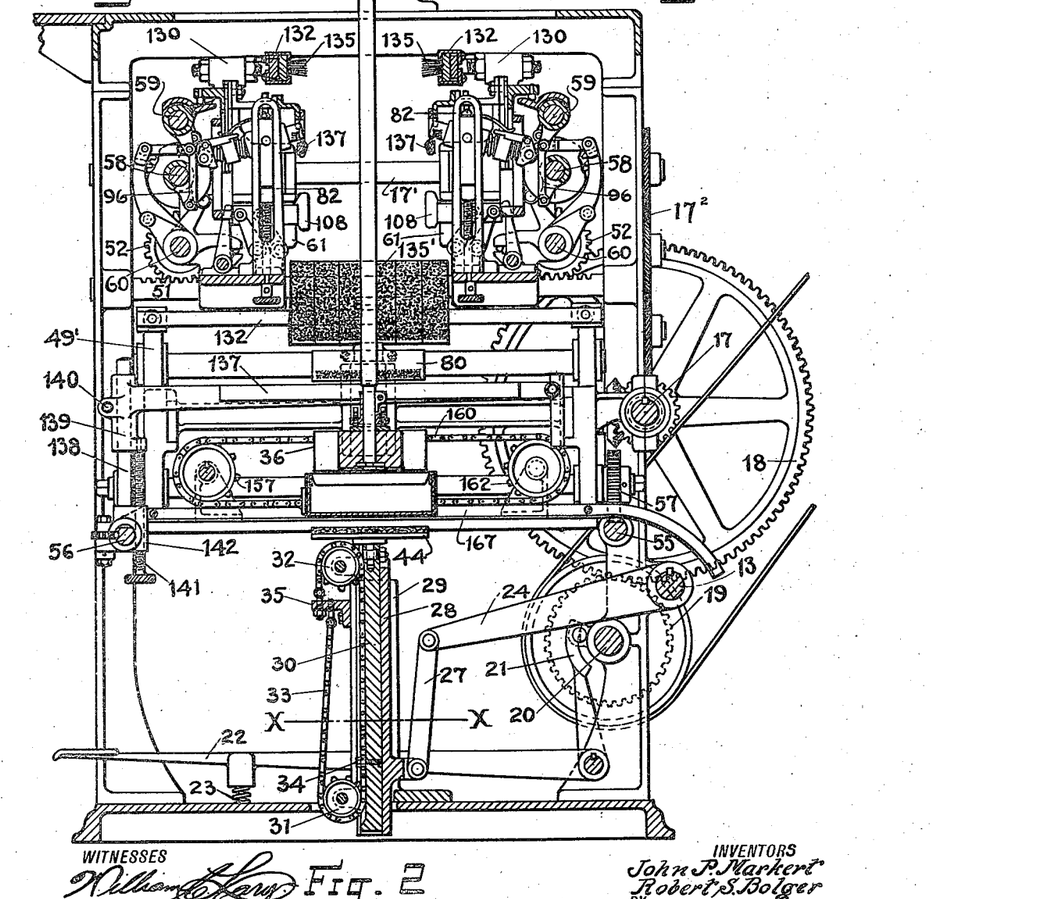
Fig. 2 is a vertical central section of the machine taken on a plane parallel to the view shown in Fig. 1.
Figure 3:
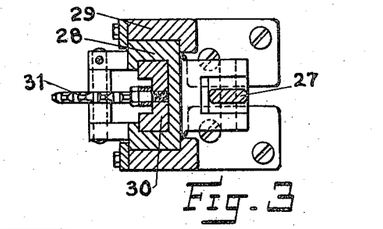
Fig. 3 is a sectional detail of the lower plunger taken on line *x—x* of Fig. 2.

This machine is provided with four units arranged in pairs, one pair indicated generally by 47 and 48, Fig. 1, being located in the upper part of the machine while the other pair is located directly beneath them, only one of which, 49, is illustrated in the assembled drawing, Fig. 1, and the opposite unit 49' on Fig. 2. One pair of these units is adapted to apply portions of the covering material to two opposite sides of the box, while the other pair of units which operates directly after the first pair have operated, are adapted to apply other portions of the covering material to the ends or other two sides of the box. These operations are performed without turning the box around, the pairs of units being arranged at right angles to each other, the upper pair, for instance, being transversely arranged to the machine as a whole, while the lower pair are longitudinally arranged with respect thereto. The construction of each of these units is substantially the same, those comprising the upper pair being exactly alike while those comprising the lower pair are like those of the upper pair except that the thumb-holing and end-tucking devices are omitted therefrom.

Figure 7:
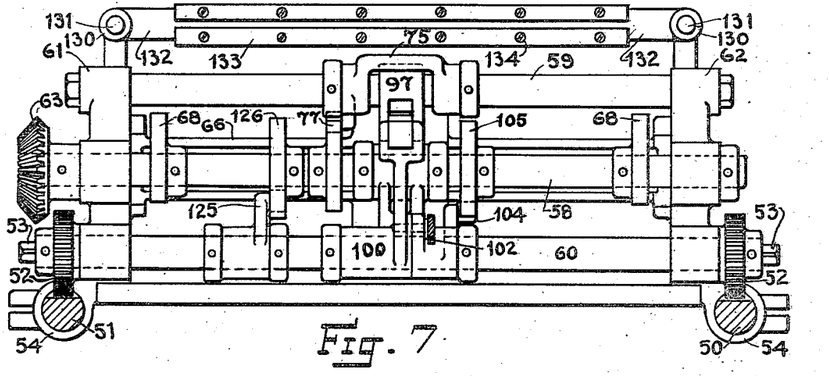
Fig. 7 is a rear elevation of one of the cover-applying units.

In the operation of the machine, the boxes to be covered are carried from the upper part of the machine downward through the center by an interrupted motion which affords an opportunity for the devices in the units to act upon them. In order that the machine may be adapted to operate upon boxes of various sizes, that is, of various length and width, the units are bodily movable or adjustable within the frame of the machine. Thus the frames of the units 47 and 48 are mounted upon two rack-bars, one of them, 50, being shown in Fig. 1 and the other, 51, being shown in Fig. 2, one end of these being mounted in one side of the main frame, while the other is mounted in the opposite side; both of the racks being shown in Fig. 7. In the frames of the units, pinions 52, 52 are mounted and are in engagement, respectively, with the racks 51 and 50. These pinions may be turned by means of a wrench applied to the squared ends 53 of the shaft 60, and thereby cause the unit as a whole to travel along the racks, the motion thereon being steadied by the elongated bearing 54 which extends from the frame of the unit and surrounds the rack-bar. Thus the units may be caused to approach or recede from each other to any desired extent depending upon the size of the box which they are to operate upon. The same arrangement of rack-bars and pinions is used to adjust the lower pair of units, the bars being indicated by 55 and 56 (Fig. 2), and the pinions by 57.

In the frame of each unit is a shaft 58, and above a tie-rod 59 which holds the upper part of the frames of the units together. In the lower bearings of the unit frames is mounted the unit adjusting shaft 60. The shaft 58 is driven through a bevel-gear 63 which derives its power from the main shaft 17 through the shaft 17' and gear 17². In the case of the lower pair of units, it will be seen that the shaft 17 is splined and carries two sliding beveled gears 64 and 65 which, respectively, drive the bevel-gears 63 on the ends of the shafts of each unit. With this arrangement, the transmission of power from the main shaft to the units is not disarranged when the units are bodily adjusted for different sizes of boxes. Substantially the same arrangement is used in connection with the two upper units.

Figures 8, 13, 22:
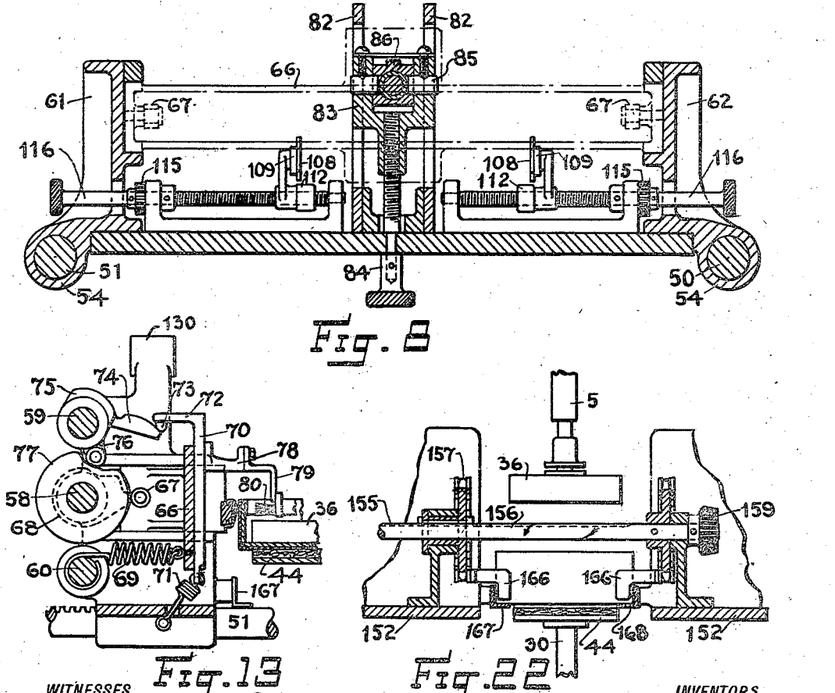
Fig. 8 is a vertical section of the same taken on a plane parallel to the view shown in Fig. 7.
Figs. 10, 11, 12 and 13 are vertical transverse central sectional views of the unit, lacking various details of construction but conventionally illustrating the mode of operation of some of the devices comprising the unit upon the box.
Fig. 22 is an end elevation thereof.

Extending between the end frames 61 and 62 of each unit is an upright plate 66 best shown in dotted lines in Fig. 8. The ends of this plate are fitted to slide in suitable guides formed in the end frames 61 and 62 and to impart motion to the plate it carries two rollers 67, one at each end, which are acted upon by cams 68—68 mounted on the shaft 58. These cams force the plate toward the center of the machine, while a spring 69, shown in Fig. 13, pulls the plate backward or keeps the rollers against the face of the cam. The function of this plate is to carry a slide 70 which is mounted at the middle on the front of the plate in suitable guides thereon, in which guides the slide is adapted to move vertically being connected with a spring 71 which tends to draw it downward and having at its upper end a rearward projection 72 provided with a toe 73 resting upon the curved surface of a finger 74 which projects from a yoke-shaped bracket 75 mounted to turn on the upper tie-rod 59. This bracket carries a roller at the end of a crank 76 which rests against cam 77 on shaft 58. Attached to the front face of the slide 70 is a bracket 78 which extends forward and terminates in a downward projection 79, to which is attached a horizontal brush or wiper 80, a face view of which is shown on one of the lower units in Fig. 2, the brush or wiper extending rearward or outward with respect to the center of the machine. The bracket 78 carries a tappet 81 in the form of an adjustable screw, the purpose of which will appear later on.

In front of the slide 70 and beneath the bracket 78 carried thereby, is a frame comprising two slotted uprights 82 (Figs. 8 and 9) firmly fixed to the lower plate of the unit, in the slots of which is mounted to slide, a thumb-holer carrier 83 being adjustable vertically by means of the screw 84. Mounted on trunnions 85 in said carrier is a frame 86 so arranged that it may swing in a vertical plane between the two uprights 82. Through the frame 86 a passage is provided for a thumb-holer tube 87 which projects from the front end of the frame and is provided on its under side with a transverse semicircular notch 88 adapted to fit over the edge of a box. The rear end of this tube is enlarged and provided with a detent 89, the enlargement forming a socket for a spring 90. Inside of the tube 87 is a bolt 91 having a cutting rim at its forward edge and at its rear end carrying a roller 92 and a latch 93. The latch normally rests in engagement with the detent 89 so that when the bolt 91 is moved forward, the tube 87 will be carried with it.

94 is a spring located in a socket within the frame 86 and surrounding the tube 87 which becomes compressed when the tube and the cutting bolt together move forward.

On the upper side of the frame 86 is a cam surface 95 which is engaged by the end of the latch 93 when the latter moves forward, to release the tube and thus permit the cutting bolt to move forward independently of the tube and across the slot 88 therein. The spring 90 which is located between the end of the tube and the end of the cutting bolt is stronger than the spring 94, so that when the tension which has been stored in spring 94 by the forward movement of the tube is free to act upon the tube when the latch is raised, it will not be strong enough to force the tube rearward against the spring 90. This spring 94, however, does serve to return the tube to its normal position shown in Fig. 9 after the cutting bolt has been permitted to recede to the position shown in said figure. The latch 93 is held in engagement with the detent 89 and the thumb-holer frame is tilted downward at the rear by a flat spring 95' secured to the top of the carriage 83. The roller 92 on the cutting bolt rests against the face of a vertical plate 96 pivotally connected at its upper and lower ends with the extremities of two cranks 97 and 98 which are pivotally hung upon the tie-rod 59 and shaft 58 respectively, thus affording a parallel movement to the plate 96. In order to swing this plate forward and thus operate the thumb-holer, the upper end is connected by means of a link 99 with a curved crank-arm 100, loosely hung on the unit adjusting shaft 60. This crank arm 100 is adapted to be connected with another crank-arm 101 by means of a removable pin 102, so that the two arms will move together. The arm 101 is part of a bell-crank lever of which the other arm is indicated by 103 and carries at its extremity a roller 104 which is actuated by a cam 105 on shaft 58. Springs 90 and 94 in the thumb-holer keep the roller 92 against the plate 96. In the operation of the thumb-holer, the plate 96 forces the tube 87 forward to the position shown at 106 in dotted lines (Fig. 9) and thereafter the tappet 81 strikes the top of the frame 86 of the thumb-holer and tilts the forward end down to the position shown in dotted lines 107 and at about the same time the latch 93 is lifted and the face-plate forces the cutting bolt across the slot in the tube. By removing the pin 102 and thereby disconnecting cranks 100 and 101 from each other, the thumb-holer is thrown out of operation.

Figures 6, 9, 14, 15:
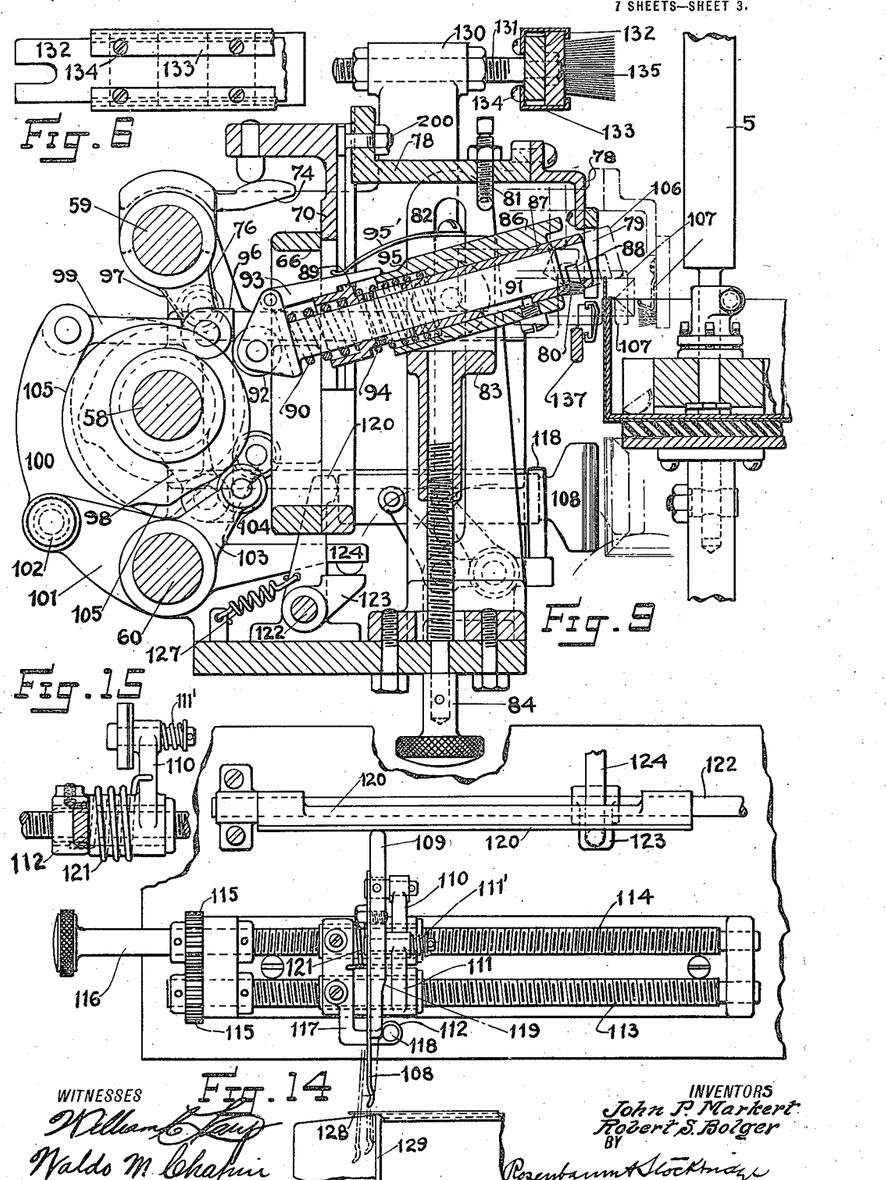
Fig. 6 is a face view of the brush-holder or a part thereof.
Fig. 9 is an enlarged sectional view of the unit taken at right angles to the section shown in Fig. 8 and through the middle thereof.
Fig. 14 is a plan of the end tucker-finger and its mounting.
Fig. 15 is a detail thereof in side elevation.

The two upper units each comprise two end tucking fingers, the function of which is to tuck or fold inward the laterally-projecting edges of the side portions of the wrapper immediately before the end portions of the wrapper are folded or wiped up against the ends of the box. These end tucker fingers comprise vertically - arranged plates or blades 108 which are fastened to a swinging thrust-bar 109. This bar is pivotally connected to the ends of two parallel crank-arms 110 and 111, the other ends of such arms being pivotally attached to a carrier 112, this arrangement affording a parallel motion to the thrust-bar 109. The pivot pin which connects the arm 111 with the bar 109 is attached to the bar and projects through the eye in the end of the arm some distance, the projecting portion being surrounded by the spring 111' which permits the bar to swing laterally slightly, there being sufficient play in the pivotal connection between the end of arm 110 and the bar to permit of such lateral movement. The carriage 112 is mounted upon two threaded rods 113 and 114, the threads of which are respectively right and left-handed and the rods being geared together at 115 so that when one of them is turned by means of the handle 116, they will both turn together and the carriage which is provided with corresponding threaded openings will be adjusted along their length. A bracket 117 attached to the carriage carries a stud 118 which bears against the side of the thrust-bar 109 and the latter is provided with a cam 119 which engages said stud at the end of the forward movement of the thrust-bar and deflects the blade 108 out of contact with the box after it has tucked in the ends of the cover. Immediately behind the thrust-bar and extending along the length of the rods 113 and 114, is a rocking-plate 120, against the face of which the thrust-bar 109 is held by the spring 121, which tends to force backward one of the parallel arms 110. This rocking-plate 120 is pivoted upon a shaft 122 which carries a crank-arm 123 (Fig. 9) which is engaged by an arm 124 of a bell-crank lever pivoted upon the adjusting shaft 60, the other arm 125 of which (Fig. 7) carries a roller which is actuated by cam 126 on shaft 58, the roller being held in engagement with said cam by spring 127 which is attached to the rocking-plate 120. There are two of these tucker fingers and the devices which actuate them on each of the upper units, as clearly shown in Fig. 8, and they operate simultaneously on the two corners of the box presented to them. By turning the handle 116, the position of the fingers can be adjusted for different sizes of boxes and are self-locking in the position to which they are adjusted. In Figs. 9 and 14 the mode of operation of these fingers is illustrated by the positions shown in dotted lines. When the box is presented to the finger as shown in Fig. 14 the side of the cover has been folded into place and the edge thereof turned down over the edge of the box, leaving the projecting ends 128 of the cover to be folded or tucked inward against the end 129 of the box, the finger 108 is then thrust forward by the rocking-plate 120 and the projecting part 128 is folded against the end of the box. At the completion of this stroke, the cam 119 strikes the stud 118 and the finger is laterally deflected out of contact with the box so that in the progressive movement of the box itself, the finger will not rub upon the turned-over portion of the cover and disarrange it.

Figure 4:
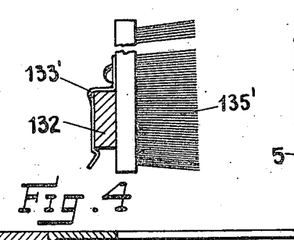
Fig. 4 is a detail of one form of brush or wiper and its holder.

On top of each of the units and projecting upward from the end frames 61, 62 thereof, are brackets 130 in which are held adjustable rods 131 supporting at their forward extremities a bar 132. This bar is adapted to carry a brush-holder 133 shown in detail in Figs. 5, 6 and 9. The brush-holder comprises two metal plates, channel shaped in cross-section, which are secured to the back of the bar 132 by means of screws 134 and project thence around the edges of the bar and afford a passage between them and the face of the bar into which to slide any appropriate number of brush sections 135, each of the sections being composed of a rectangular block or head adapted to fit into the groove or channel of the brush-holder and carrying bristles or wiping material of any suitable kind which projects outward from the channel. When a number of these sections are applied close together in a group in the holder, they serve, in effect, the same as a single brush, and by making them in sections, we are able to readily alter the length of the brush to conform to the length of the side of the box upon which it is to operate. Thus, in Fig. 5, it will be seen that the four sections of brush there illustrated comprise, in effect, a single brush slightly less in length than the side of the box upon which they are to operate. The importance of a sectional brush for this purpose is emphasized when it is understood that the brush, in order to perform the best work, must in no case be longer than the side of the box against which it is to operate and should for the best results be somewhat shorter. The reason for this is that if the brush extends beyond the corners of the box in the wiping operation, the end bristles will strike the end flaps of the cover which are indicated in Fig. 5 by 136 and also the extensions 128. This will disarrange these parts of the cover and prevent the end tucking fingers and the brushes which thereafter act upon the parts 136 from neatly performing their functions. The sections of these brushes can be made in various sizes, if desired, so that any combination of them can be made up to obtain a brush of exactly the length desired. The brushes used in the two lower units, one of which is seen in Fig. 2 at 135', are made up of sections deeper than those used in connection with the two upper units, and they are preferably attached to the supporting bar 132 in a different manner from those heretofore described. Fig. 4 shows the brush 135' and its mounting in detail. It will be seen that the brush section is provided with a spring clip 133' which is adapted to pass over the top and rear of the supporting bar 132 and engage with the under edge thereof. By this arrangement the sections can be adjusted to any position on the bar and readily attached and removed. These sections of the brush 135' are made deeper than those for the upper unit for a purpose which will hereinafter appear.

In front of each of the units extends a cross-bar 137 which is supported on one side of the machine by posts 138. The end of the bar is provided with a boss 139 which passes over the post and is adapted to be clamped thereto at any elevation to which it may have been adjusted, by the bolt 140. In order to vertically raise and lower this bar, a hand-screw 141 is provided which threads through the casting 142 in which the post is fixed and engages with the boss 139. The casting 142 embraces one of the rack-rods upon which the unit with which the bar is associated rides. In the case of the lower unit shown in Fig. 2, this rack-rod is indicated by 56, and in the case of the upper units, the rack-rod is indicated by 50. The free end of the bar 137 is provided with a set-screw 143 which bears against a plate 144 attached to the frame of the unit. In order to be able to adjust this bar 137 toward and away from the center of the machine, it is made to slide freely along the rack-bar and can be clamped at any position thereon by means of the bolt 145. When this bolt is loosened, the entire bar 137 with its supporting parts can be moved along bodily. After it is thus generally located, it can be more finely adjusted in position by rotating the pinion 146 by means of a wrench applied to the stud 147, which pinion meshes with a second rack on the side of the bar 56, causing the entire bar 137 and its attachments to move to the exact position desired. When this adjustment is obtained, the set-screw 143 is adjusted so that its tip will rest upon the plate 144, without causing any spring or bend in the bar 137. This bar we call the "resisting bar", the function of it being to furnish a support for the outside of the wall of the box while the brush is pressing against the opposite or inside of the box in the operation of wiping the cover into place.

Instead of permitting the side of the box to rest directly against the face of the resisting bar, we prefer to insert contact plates 148 between the box and the face of the bar. These contact plates may be of various forms, but in general consist of strips of metal, shown in detail in Figs. 18 and 19, which are bent so that their extremities form hooks 149 which will engage in grooves 150 formed in the upper and lower faces of the resisting bar. These plates bow outward from the face of the bar itself to prevent the wall of the box from resting against the bar. The reason for preventing contact between the box and the face of the bar, is that the bar soon accumulates paste which is squeezed out from under the edges of the cover by the brushes and after a while soils the box or cover in passing it. These contact plates 148, which are adjustable to any position along the face of the bar by merely sliding them in the grooves 150, can be placed at points where the paste will not reach them (as seen for instance in Fig. 16), while any other plates that may not be in use may be moved off to one side (as for instance those indicated by 148'). The resisting bar used in connection with the two upper units is provided with a depression in its upper edge at the middle point of the bar, as seen at 151 in Fig. 16, which permits the thumb-holer to be projected across the path of the bar, but in the resisting bars for the two lower units, this is not necessary since there is no thumb-holer provided in these units.

Figure 20:
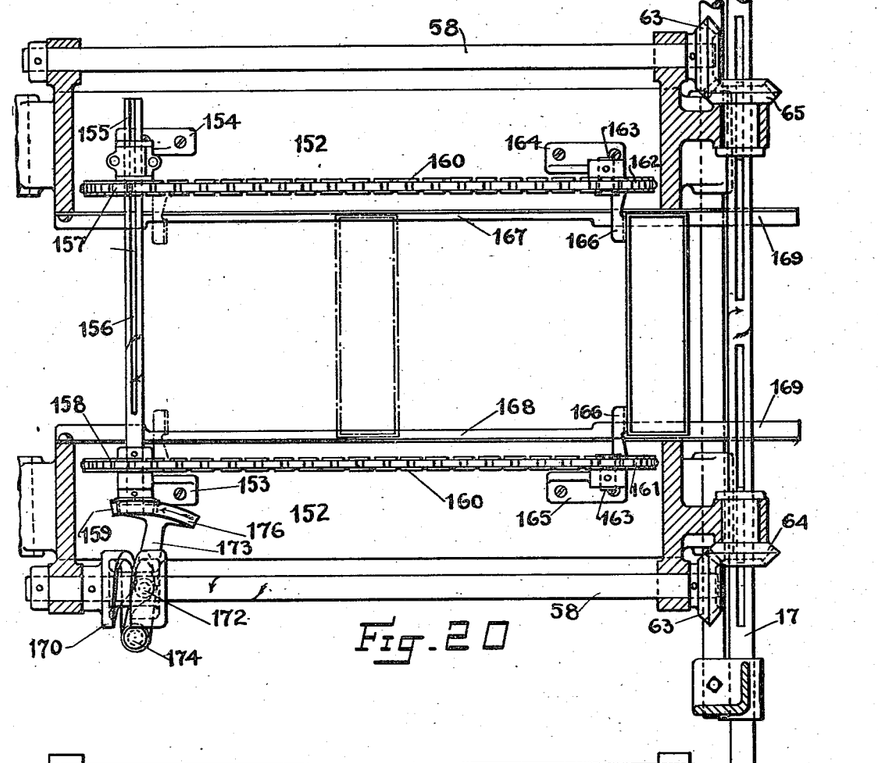
Fig. 20 is a plan of the box-ejecting mechanism.
Figure 21:
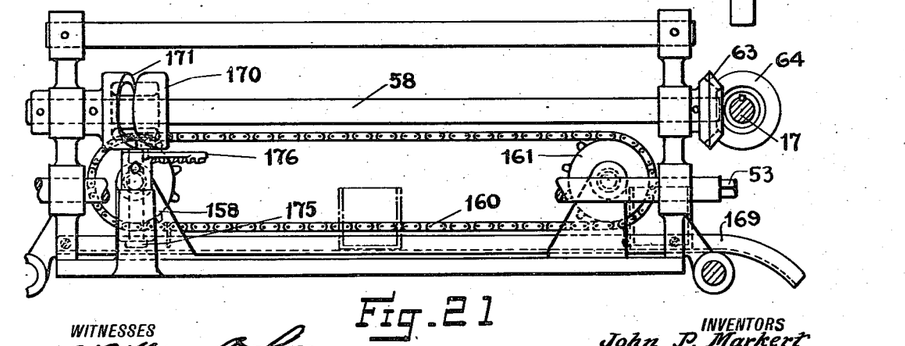
Fig. 21 is a side elevation of the same.

Incorporated with the two lower units is the delivery or ejecting mechanism for the boxes after the covers have been applied to them. This mechanism is shown in Figs. 20, 21 and 22. Mounted upon the floor plates 152 of the two lower units, respectively, are the bearing brackets 153 and 154 which support a shaft 155 which is provided with a spline 156 enabling it to slide through the bearing in the bracket and thus permit of the two units moving toward and away from each other. This shaft carries two sprocket wheels 157 and 158, the former being also splined to the shaft for the same purpose before mentioned. One end of the shaft carries a bevel pinion 159 by which it is driven. Chains 160 pass over the sprocket wheels and extend to the opposite ends of the units, respectively, where they pass over two other sprocket wheels 161 and 162 which are mounted on studs 163 supported in bearing brackets 164 and 165. These chains are each provided with a pusher finger 166 which are placed thereon directly opposite and projecting inward toward each other. Arranged parallel to the chains and just above the floor of the unit are two angle shaped rails 167 and 168 which extend the full length of the units and terminate in downwardly-curved ends 169. These angle rails together constitute a track adjacent to which the boxes are positioned by the plunger after the cover has been applied thereto, in about the position indicated in dotted lines in Figs. 20 and 21. On the drive-shaft 58 of one of the units is mounted a cylindrical cam 170 provided with a cam-groove 171 in which runs a roller 172. This roller is carried by an arm 173 which is pivoted at 174 upon a bracket 175. The forward end of this arm is provided with a segment of gear 176 which meshes with the pinion 159. The shape of the groove 171 in the cam is such that the arm 173 is oscillated back and forth once during each rotation of the shaft 58, the motion in one direction being somewhat slower than it is in the other direction. This oscillation causes the chains 160 to travel the distance between the two sets of sprocket wheels, first in one direction and then in the other, and in doing so to carry the fingers 166 which are attached to the lower lead of the chain, from the extreme position to the left as seen in Fig. 20 in dotted lines to the extreme position to the right as shown in full lines, and then return. In moving to the right, the fingers strike against the box which has been in the meantime positioned adjacent to the tracks 167 and 168 and carries it to the delivery end of the tracks, the next succeeding box striking it and forcing it finally from the machine.

Figure 10:
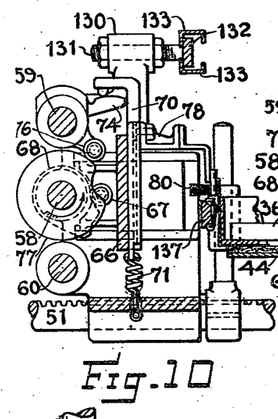
Figure 11:
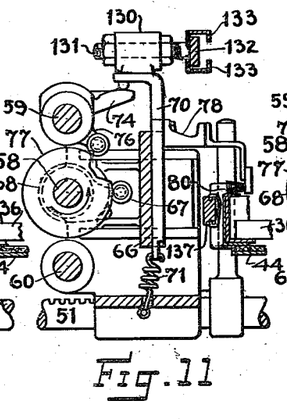
Figure 12:
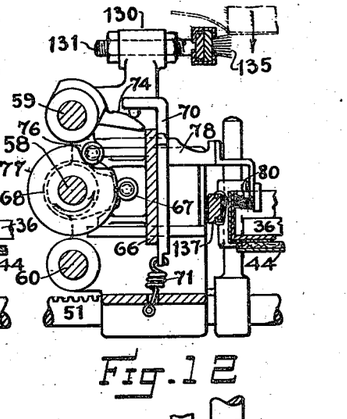

In Fig. 1 a box to which the cover has been applied during its passage through the machine is seen located upon the tracks 167 and 168, and about to be ejected from the machine by the chains 160 and push fingers 166, the lower plunger 44 having dropped below the box and the upper plunger 36 having lifted out of the box. As soon as the box has been moved out of the path of the plungers, the cam-disk 16 causes both plungers to rise to the upper part of the machine, the lower plunger-head stopping practically on a level with the top of the main frame 1, the upper plunger rising sufficiently high above this level to admit of the introduction of a box between the two plungers. Either the operator or a suitable automatic feeding mechanism then places a gummed wrapper with a box centered thereon directly over or upon the lower plunger, the two plungers remaining stationary by reason of the shape of the cam in the disk 16 long enough to permit this operation. Then the upper plunger lowers into the box and clamps its bottom against the lower plunger; immediately, the box with its wrapper thus clamped is carried downward to the position shown in Fig. 9. In doing so, the horizontally protruding sides of the wrapper strike the stationary brushes 135 on the two upper units and are wiped upward and into intimate contact with the side walls of the box as shown in Fig. 9. When the box reaches the position shown in Fig. 9, the cam 16 halts the plungers temporarily and during this interval the cam on shaft 58 of the unit acting upon roller 67 throws the plate 66 forward; this carries the slide 70 and the bracket 78 with brush 80 forward, which forward movement is, by reason of the curved surface on the finger 74, in a curvilinear direction, first moving upward slightly and then downward. This causes the front of the extremity of the brush-holder to strike the upwardly-projecting margin of the side wrapper and bend it over the top edge of the wall of the box as shown in Figs. 10 and 11. When the slide 70 has nearly completed its traverse of the curved surface on the finger 74, the roller on the end of the arm 76 drops into a notch in cam 77, permitting the finger 74 to drop to the position shown in Fig. 12, and the slide being under the action of spring 71, lowers at the same time causing the brush 80 to wipe the wrapper margin down against the inside of the wall of the box. Immediately thereafter raised parts of cams 68 move plate 66 farther inward causing brush 80 to retreat toward the center of the box and out of contact with the margin of the wrapper which it has just wiped into place, as seen in Fig. 13. Thereupon, the roller on arm 76 moves out of the notch in its cam, causing the slide 70 with the brush 80 to be lifted out of the box without a reverse wiping action upon the turned-over margin of the wrapper, and at the same time the cams 68 actuating the plate 66 permit the plate to be drawn rearward by spring 69 thus returning the brush-holder to its starting position. While the brush 80 is pressing against the inside of the wall of the box and wiping the margin of the wrapper against the same, the side of the box is prevented from bulging outward by the resisting-bar 137 carrying the clips upon which the wall of the box is resting. At the same time that the brush 80 is moving forward to wipe over the margin of the wrapper, the thumb-holer tube 87 is being forced forward to the dotted line position 106 (Fig. 9) and as the brush moves downward to wipe the margin of the wrapper against the inside wall of the box, the tappet 81 carried by the brush-holder bracket strikes the top of the thumb-holer frame and tilts its forward end downward until the notch 88 on its under side passes over the edge of the box. Coincidently with the retreat of the brush from the inside wall of the box, the latch 93 of the thumb-holer is lifted and the cutting bolt 91 is thrust forward across the notch 88 and cuts out a thumb-hole from the edge of the box, the cut-out section being pushed into the box and dropping to the bottom thereof within the curved cut-out portion of the plunger-head 37, as shown in Fig. 9 in dotted lines. Upon the lifting and retreat of the brush 80, the tappet 81 releases the thumb-holer and permits the spring 95 to tilt the same in the opposite direction, while simultaneously the cams which actuate the thumb-holer permit the springs 94 and 90 to withdraw the thumb-holer tube and cutting-bolt out of range of the next box which is to pass through the machine.

It will be understood of course that the same operations above described are simultaneously carried on by the two upper units, the two opposite sides of the box being treated in the same way. When these operations have been completed the cam 16 moves the plungers with the box between them to a position shown in dotted lines (Fig. 9) opposite the end-tucking fingers where there is another slight halting to permit the end-tuckers, two in each unit, to pass inward and fold the projecting ends 128 (Fig. 5) against the ends of the box, this motion of the tucking fingers 108 being accomplished by the rocking-bar 120 under the action of cam 126 on the shaft 58. Having accomplished this, the box is carried by the plungers immediately between the deep brushes 135' of the two lower units and these act to fold or wipe upward the ends 136 (Fig. 5) of the wrapper against the end walls of the box, the upper margins of the wrapper projecting upward beyond the edge of the box in the same manner as the edges of the side wrappers were left standing by the brushes 135. On account of the depth of the brushes 135' they act at once after the end-tuckers have performed their function and remain in contact with the end walls of the box for a period which insures the adhesion of the pasted wrapper thereto or the holding of the loose wrapper until the margin thereof is about to be acted on by the brush 80. The motion past these brushes is, however, continuous until the box arrives at a position between the two lower units which corresponds to the position of the box shown in full lines in Fig. 9 with respect to the upper units. In this new position the box is again halted until the brushes 80 of the two lower units fold over and wipe downward the projecting margin of the end wrappers against the inner end walls of the box, this operation being accomplished in the same manner and by the same kind of mechanism as it was accomplished by the upper pair of units. The operation of covering the box is then complete and the plungers next carry it downward until it is about on a level with the rails 167 and 168, as shown in Figs. 1 and 2.

By further action of the cam-disk 16, the two plungers separate, one moving downward while the other moves upward to free the box, while in the meantime the cam 170 actuates the segment 176 causing the chains 160 to move and carry the finger against the box to slide it from the lower plunger to the rails and then to the rear of the machine as shown in Fig. 20. In the meantime the plungers are rising to receive another box.

By receiving the waste from the thumb-holer in the box itself, it is carried out of the machine and cannot collect therein at any point to interfere with the operation of the mechanism. The plunger-head 36 being cut away at opposite sides insures that the thumb-hole waste will not be deposited upon the top of the plunger block but will pass to the bottom of the box whence it can be readily removed during the inspection of the boxes after they are ejected from the machine.

We wish to particularly emphasize the operation of the brushes 80 which fold over the margin of the wrappers and wipe them downward against the inside of the boxes. On account of the curvilinear direction of travel of the brushes, starting as they do from a low point on the outside of the box, rising over the edge of the box, and then passing downward perpendicularly, they may be depended upon to properly fold over and secure the margin of the wrapper notwithstanding the fact that the paste or gum which is applied to them may have caused the protruding margin to curl and get out of shape before the box arrives at the position where these brushes act. In other words, by this peculiar motion of the brushes, they reach under the projecting margin and lift it, if necessary, before bending it over the edge of the box.

In adjusting the units for action upon different sizes of boxes, it is pointed out that a preliminary adjustment of the resistance-bars 137 can be very quickly accomplished by feeding a box of the size to be acted upon between them and adjusting them up into contact with the box locking them in this position. Having done this, it will be found convenient to adjust the units as a whole up to a position corresponding to the new location of the resistance-bars.

In connection with the box delivery devices, it will be noted that these devices are carried upon the two lower units and are automatically adjusted at the same time that the units are adjusted, consequently no change is necessary in the delivery device to adapt it to receive and eject boxes of different sizes, inasmuch as the act of adjusting the units at the same time adjusts the delivery devices.

Since the plunger-head which enters the box is of smaller size than the box itself, no "picking off" mechanism is required to remove the finished box from the head, since gravity alone accomplishes this. Any suction that might take place between the box and the lower side of the block is prevented by the lateral air passage 41'.

The mechanism of each unit is adjustable independently of all of the others. For instance, the bracket 78 carrying brush 80 is adjustable in height upon the slide 70 by means of a bolt 200. The thumb-holer is likewise adjustable vertically by means of the screw 84. These constructions make it possible for the machine to act upon boxes having one or more sides higher than the others. Thus, in either of the two upper units, the brush 80 and thumb-holer may be adjusted for a certain height of side wall of box while in the other unit these two mechanisms may be adjusted for a different height of side wall of box, and the same thing may be done in respect of the two lower units.

Figures 27, 28, 32, 33:
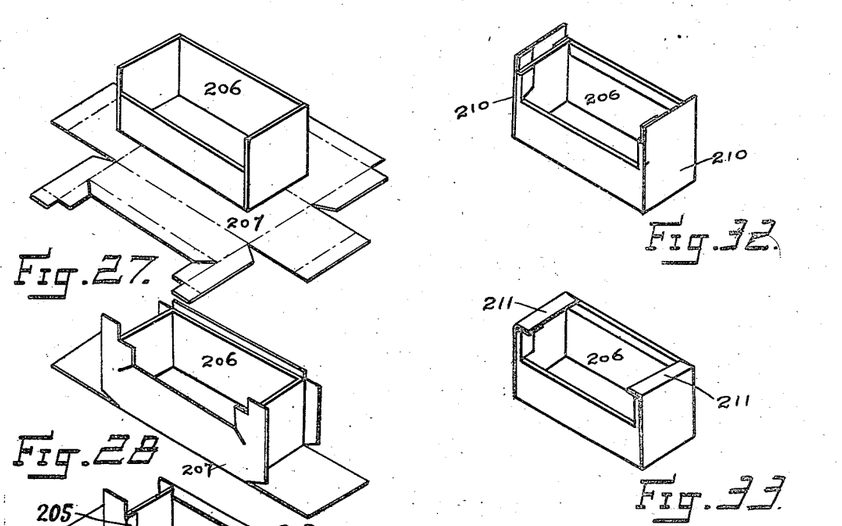
Figs. 27 to 34 illustrate the various stages in the process of applying the covering material to boxes having one wall higher than another.
Figures 29, 30, 31:
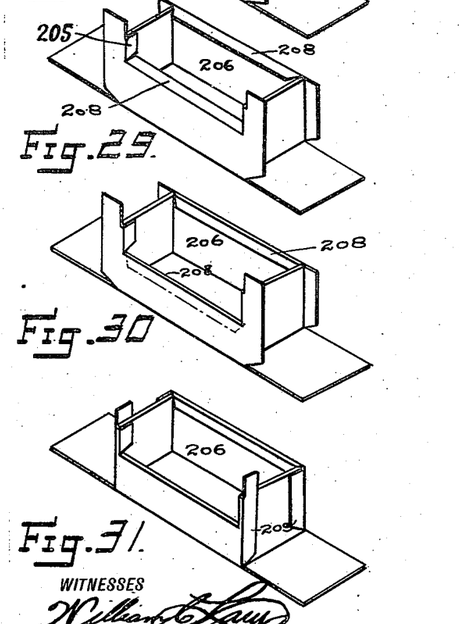
Figure 34:
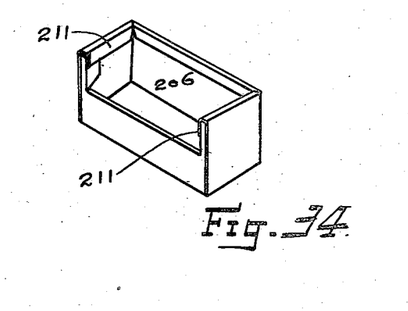

Figs. 27 to 34 illustrate the different stages in the operation of applying the covering to a box having two opposite sides of different height. Fig. 27 shows the box 206 positioned on the wrapper 207 and ready to be clamped by the plungers and started through the machine; Fig. 28 shows the box after two sides of the wrapper have been wiped thereon; Fig. 29 shows the margins 208 of these two sides turned inward, and at this stage we call attention to the portions 205 of the margins which have been turned in by the right-angled portions 80' of the brush 80 (Figs. 25 and 26); Fig. 30 shows the margins 208 wiped downward into contact with the inside wall; Fig. 31 shows the ends 209 of the side wrappers turned in against the end walls of the box by the tucker fingers; Fig. 32 shows the end wrappers 210 wiped upward against the ends of the box; Fig. 33 shows the projecting margins 211 of the end wrappers turned over, and Fig. 34 shows the end margins wiped downward against the inside of the walls of the box, thus completing the operation.

The construction whereby we are able to adjust the automatic machine for operation upon boxes whose walls are either all of the same height or some of different height, is an important feature of our invention and it will be observed that the adjustments necessary to accomplish this do not include any change in the adjustment or travel of the plungers, the latter remaining constant for all sizes of boxes.

Having thus described our invention, we claim:—

1. In a box covering machine, the combination of a pair of plungers between which the box is clamped and by which the same is carried through the machine, said plungers together having a synchronous reciprocatory motion, a power-shaft, and means whereby said plungers are independently and positively driven in both directions from said power-shaft, substantially as described.

2. In a box covering machine, the combination of two plungers between which the box to be acted upon is clamped, one of said plungers having a telescoping stem, a chain attached to one of the members of said stem, a pair of wheels carried by another member of said stem and over which said chain runs, the chain being anchored at one fixed point in its length whereby the actuation of one of the plunger-sections in either direction will cause the other to positively move in a corresponding direction but at a different speed, substantially as described.

3. In a box covering machine, a box clamping plunger comprising a stem and head, the latter having an opening of larger diameter than the stem, through which the stem passes, a sleeve surrounding said stem and provided with a flange substantially parallel to the head, said flange provided with a plurality of adjusting screws bearing against said head whereby the angle of the head with respect to the stem may be adjusted.

4. In a box covering machine, a box clamping plunger comprising a stem and a head, the head having a central orifice countersunk on its working face, the stem adapted to pass through said orifice, a crosshead engaging with said stem and located in said countersink, and a sleeve carried by the stem and provided with adjusting screws bearing upon said head.

5. In a box covering machine, a plunger-head adapted to enter a box and rest against the bottom thereof, said head having cutaway portions exposing the bottom of the box, in combination with means for cutting thumb holes in the box, said means being located in the planes of said cut-away portions, for the purpose set forth.

6. In a box covering machine, a device adapted to fold the margin of the cover over the upper edge of the box, said device having a curvilinear movement while in engagement with the cover margin from a low point on the outside of the box below its upper edge, over the upper edge thereof to a point on the inside of the box below its upper edge, substantially as described.

7. In a box covering machine, a brush for folding the margin of the wrapper over the edge of the box, in combination with means for imparting to said brush a curvilinear motion from a position outside of the box and below its edge, over the edge thereof, thence downward inside of the box, and finally toward the center of the box, for the purpose set forth.

8. In a box covering machine, a device for folding the margin of the wrapper over the edge of the box, a slide on which said device is carried, a plate carrying said slide and having a motion at right angles to that of the slide, means for imparting motion to said plate, and independent means for imparting motion to said slide whereby a compound motion is imparted to the said device for the purpose set forth.

9. In a box covering machine, the combination of means for pressing the covering material against the side of the box, and a stationary resistance-bar adapted to support the side of the box during such operation, said resistance-bar being mounted and adjustable independently of said pressing means.

10. In a box covering machine, the combination of a unitary structure comprising devices for wiping the cover upon the box, a resistance-bar adapted to support the side of the box while the cover is being wiped thereon, and a rack-bar upon which the unitary structure and the resistance-bar are independently mounted, and means for independently adjusting the unitary structure and resistance-bar along said rack-bar, for the purpose set forth.

11. In a box covering machine, a resistance-bar provided with a plurality of adjustable pressure and spacing plates, means for presenting the exterior surface of a box to said plates, and means for forcing the interior surface thereof toward the plates.

12. In a box covering machine, a resistance-bar provided with a pair of grooves in opposite faces, in combination with a plurality of contact-plates embracing said faces and having edges engaging respectively with said grooves and adjustable to different positions therein.

13. In a box covering machine, the combination of a resistance-bar, a supporting-post with which the bar has sliding connection, a rack-bar upon which said post is supported, means for vertically adjusting the bar upon said post, and means carried by the post and adapted to engage said rack-bar for adjusting the post along the rack-bar, substantially as described.

14. In a box covering machine, the combination of an end-tucking finger, a thrust-bar to which the same is attached, a carriage to which the bar is pivoted, right and left screws working through said carriage, and gearing connecting said screws whereby the rotation of one of them will adjust the position of the carriage along the screws.

15. In a box covering machine, an end-tucking finger in combination with a thrust-bar to which the same is attached, means for imparting a parallel reciprocatory movement to the thrust-bar comprising two parallel levers to which said thrust-bar is pivoted, and means for deflecting the finger laterally at the end of its forward stroke.

16. In a box covering machine, the combination of an end-tucking finger, a reciprocatory bar to which the finger is attached, said bar provided with a cam surface, and a fixed obstruction in line with said cam surface whereby the engagement of the same by the cam will cause a lateral movement of the bar.

17. In a box covering machine, the combination of a pivotally mounted thumb-holer, and a wrapper margin folding device having a reciprocatory motion in the plane of the tilting motion of the thumb-holer on its pivot, said device carrying a tappet adapted to strike the thumb-holer and swing it on its pivot, for the purpose set forth.

18. In a box covering machine, the combination of adjustable mechanism for applying the covers to the boxes, and mechanism for automatically delivering said boxes out of the machine after they have been covered, and means whereby the adjustment of the covering mechanism for different sizes of boxes will automatically adjust the delivery mechanism for the same sizes of boxes.

19. In a box covering machine, the combination of two units, each comprising cover-applying devices adapted to operate simultaneously upon opposite sides of a box, a delivery mechanism for conveying the finished boxes out of the machine, said delivery mechanism being formed in two parts mounted, respectively, upon said units, and means for bodily adjusting said units to conform to different sizes of boxes.

20. In a box covering machine, a delivery device comprising two rails upon which the finished boxes are delivered, said rails being adjustable toward and away from each other for different sizes of boxes, two endless carriers provided with means for engaging with the boxes and arranged parallel to the rails, two pairs of wheels, one for each endless device, a shaft carrying one of each pair of said wheels, means whereby the wheels may be adjusted toward and away from each other without disconnecting them from the shaft and means for imparting a reciprocatory motion to said carriers.

21. In a box covering machine, a delivery device comprising a pair of endless chains carrying box ejecting devices, sprocket wheels over which said chains move, a pinion connected with said sprocket wheels, and an oscillating gear segment meshing with said pinion whereby the chains are given a back and forth movement in combination with a track adapted to receive the finished box, said track being parallel to the movement of the chains.

22. In a box covering machine, a pair of units adapted to act simultaneously upon opposite sides of a box to apply a wrapper thereto, each unit as a whole and parts thereof being independently adjustable to adapt the units to act upon two box sides of different dimensions simultaneously.

23. In a box covering machine, the combination of a pair of plungers between which the box is held, said plungers having a movement which carries the box past the various cover-applying devices, and cover-applying devices arranged in units independently adjustable to different positions along the path of said plungers, parts of each unit being also independently adjustable to adapt them to boxes whose walls are of different heights.

24. In a box covering machine, the combination of a pair of units, each comprising cover-applying devices and being adjustable with respect to each other, and a box ejecting mechanism, parts of which are comprised in one unit and other parts in the other unit, whereby adjustment of the ejector will be made when the units are adjusted.

25. In a box covering machine, the combination of a holder for the box while its cover is being applied, a stationary delivery platform for the box, and means whereby the box will be deposited upon the platform when released by the holder.

26. In a box covering machine, the combination of a holder for the box while its cover is being applied, a stationary delivery platform for the box, means whereby the box will be deposited by the holder upon the platform, and a reciprocating device adapted to engage the box when so deposited and carry it out of the machine.

27. A box covering machine comprising a pair of plungers between which the box is gripped and by which it is carried in a definite path, and cover affixing mechanism embodying a stationary pressure resisting bar, and adjustable spacing plates on said bar movable laterally for the purpose set forth.

28. A box covering machine comprising plunger mechanism for directing a box and presenting same to covering devices, cover affixing mechanisms arranged in two independent units each comprising a brush holder, a brush and means for moving said holder and brush at right angles to the movement of the plunger and box and also to a limited extent in the direction of travel of plunger and box and means for adjusting said units to operate respectively and simultaneously on box walls of different size.

29. A box covering machine comprising plunger mechanism for moving and directing a box, a resistance bar provided with adjustable pressure and spacing plates adapted to contact with the outer side of box when the plunger mechanism with the box is in operative relation thereto.

30. A box covering machine comprising a pair of plungers between which the box is gripped and by which it is carried in a definite path, a resistance bar provided with a pair of grooves in opposite faces, in combination with a plurality of contact plates engaging the said grooves and adjustable to different positions thereon.

31. A box covering machine comprising a pair of plungers between which the box is gripped and by which it is carried in a definite path, a resistance bar provided with pressure and spacing plates and means for adjusting any number of said plates to conform to length of box being operated on.

In witness whereof, we subscribe our signatures, in the presence of two witnesses.

JOHN P. MARKERT.
ROBERT S. BOLGER.

Witnesses:
  WALDO M. CHAPIN,
  JULE ZELEUDO.